(12) United States Patent
Pan et al.

(10) Patent No.: US 12,047,565 B2
(45) Date of Patent: Jul. 23, 2024

(54) HIERARCHICAL HISTOGRAM CALCULATION WITH APPLICATION TO PALETTE TABLE DERIVATION

(71) Applicant: ATI Technologies ULC, Markham (CA)

(72) Inventors: Feng Pan, Markham (CA); Wei Gao, Markham (CA); Yang Liu, Toronto (CA); Crystal Yeong-Pian Sau, Markham (CA); Haibo Liu, Markham (CA); Edward A. Harold, Markham (CA); Ying Luo, Markham (CA); Ihab Amer, Markham (CA); Gabor Sines, Markham (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 17/385,030

(22) Filed: Jul. 26, 2021

(65) Prior Publication Data

US 2021/0352282 A1 Nov. 11, 2021

Related U.S. Application Data

(63) Continuation of application No. 16/588,772, filed on Sep. 30, 2019, now Pat. No. 11,076,151.

(51) Int. Cl.
*H04N 19/115* (2014.01)
*H04N 19/176* (2014.01)
(Continued)

(52) U.S. Cl.
CPC ......... *H04N 19/115* (2014.11); *H04N 19/176* (2014.11); *H04N 19/182* (2014.11); *H04N 19/186* (2014.11)

(58) Field of Classification Search
CPC .. H04N 19/115; H04N 19/176; H04N 19/182; H04N 19/186; H04N 19/136; H04N 19/593; H04N 19/105; H04N 19/15
(Continued)

(56) References Cited

U.S. PATENT DOCUMENTS

| 5,274,754 A | 12/1993 | Sfarti |
| 5,818,456 A | 10/1998 | Cosman et al. |

(Continued)

FOREIGN PATENT DOCUMENTS

| CA | 2931386 A1 | 5/2015 |
| CA | 2930174 A1 | 7/2015 |

(Continued)

OTHER PUBLICATIONS

International Search Report and Written Opinion in International Application No. PCT/US17/13786, mailed Apr. 4, 2017, 13 pages.
(Continued)

*Primary Examiner* — Susan E. Torgerson
(74) *Attorney, Agent, or Firm* — Kowert, Hood, Munyon, Rankin & Goetzel, P.C.; Rory D. Rankin

(57) ABSTRACT

Systems, apparatuses, and methods for calculating multi-pass histograms for palette table derivation are disclosed. An encoder calculates a first histogram for a first portion of most significant bits (MSBs) of pixel component values of a block of an image or video frame. Then, the encoder selects a given number of the highest pixel count bins from the first histogram. The encoder then increases the granularity of these selected highest pixel count bins by evaluating one or more additional bits from the pixel component values. A second histogram is calculated for the concatenation of the original first portion MSBs from the highest pixel count bins and the one or more additional bits, and the highest pixel count bins are selected from the second histogram. A palette (Continued)

table is derived based on these highest pixel count bins selected from the second histogram, and the block is encoded using the palette table.

20 Claims, 15 Drawing Sheets

(51) Int. Cl.
*H04N 19/182* (2014.01)
*H04N 19/186* (2014.01)

(58) Field of Classification Search
USPC .......................................... 375/240
See application file for complete search history.

(56) References Cited

U.S. PATENT DOCUMENTS

| | | | |
|---|---|---|---|
| 6,339,426 | B1 | 1/2002 | Lui et al. |
| 6,518,981 | B2 | 2/2003 | Zhao et al. |
| 6,525,723 | B1 | 2/2003 | Deering |
| 6,999,619 | B2 | 2/2006 | Toda |
| 7,133,565 | B2 * | 11/2006 | Toda .......................... G06T 9/00 382/176 |
| 7,456,846 | B1 | 11/2008 | King et al. |
| 7,684,641 | B1 | 3/2010 | Toksvig |
| 7,916,155 | B1 | 3/2011 | Moreton |
| 8,269,788 | B2 | 9/2012 | Tuomi |
| 8,345,063 | B2 | 1/2013 | Iourcha et al. |
| 8,928,690 | B2 | 1/2015 | Brennan |
| 9,019,299 | B2 | 4/2015 | Iourcha et al. |
| 9,363,421 | B1 | 6/2016 | Russell |
| 9,910,897 | B2 | 3/2018 | Becker et al. |
| 10,152,772 | B2 | 12/2018 | Fainstain |
| 10,282,889 | B2 | 5/2019 | Tannenbaum et al. |
| 11,076,151 | B2 | 7/2021 | Pan et al. |
| 2001/0030655 | A1 | 10/2001 | Anwar |
| 2002/0093520 | A1 | 7/2002 | Larson |
| 2003/0043169 | A1 | 3/2003 | Hunter |
| 2003/0095134 | A1 | 5/2003 | Tuomi et al. |
| 2003/0206179 | A1 | 11/2003 | Deering |
| 2003/0206663 | A1 | 11/2003 | Daly |
| 2003/0210251 | A1 | 11/2003 | Brown |
| 2005/0062767 | A1 | 3/2005 | Choe et al. |
| 2006/0061592 | A1 | 3/2006 | Akenine-Moller et al. |
| 2006/0087518 | A1 | 4/2006 | Ameline et al. |
| 2007/0257935 | A1 | 11/2007 | Koduri et al. |
| 2008/0012878 | A1 | 1/2008 | Nystad et al. |
| 2009/0002370 | A1 * | 1/2009 | Helfman .................. G06T 11/60 345/440 |
| 2009/0046108 | A1 | 2/2009 | Brown Elliott et al. |
| 2009/0129664 | A1 | 5/2009 | Tsuchiya et al. |
| 2009/0167778 | A1 | 7/2009 | Wei |
| 2009/0195552 | A1 | 8/2009 | Nystad |
| 2009/0256848 | A1 | 10/2009 | Iourcha et al. |
| 2010/0002000 | A1 | 1/2010 | Everitt et al. |
| 2010/0246692 | A1 | 9/2010 | Rusanovskyy et al. |
| 2011/0142366 | A1 | 6/2011 | Young |
| 2011/0150331 | A1 | 6/2011 | Young |
| 2011/0249011 | A1 | 10/2011 | Lalonde et al. |
| 2011/0274175 | A1 | 11/2011 | Sumitomo |
| 2012/0127331 | A1 | 5/2012 | Grycewicz |
| 2013/0222442 | A1 | 8/2013 | Gu et al. |
| 2013/0249927 | A1 | 9/2013 | Brennan |
| 2014/0118352 | A1 | 5/2014 | Hakura et al. |
| 2014/0176541 | A1 | 6/2014 | Surti et al. |
| 2014/0267232 | A1 | 9/2014 | Lum et al. |
| 2014/0327696 | A1 | 11/2014 | Pomianowski et al. |
| 2015/0070381 | A1 | 3/2015 | Lum et al. |
| 2015/0146976 | A1 * | 5/2015 | Ma .......................... H04N 1/646 382/166 |
| 2015/0186100 | A1 * | 7/2015 | Tsai ....................... H04N 19/70 375/240.12 |
| 2015/0193968 | A1 | 7/2015 | Barringer et al. |
| 2015/0311265 | A1 | 10/2015 | Matsueda et al. |
| 2015/0341643 | A1 * | 11/2015 | Xu ....................... H04N 19/176 375/240.02 |
| 2016/0035129 | A1 | 2/2016 | Bolz et al. |
| 2016/0057420 | A1 | 2/2016 | Pang et al. |
| 2016/0203578 | A1 | 7/2016 | Shoshan et al. |
| 2016/0212332 | A1 | 7/2016 | Tang et al. |
| 2016/0217341 | A1 * | 7/2016 | Hung ................. G06F 18/23213 |
| 2016/0366386 | A1 | 12/2016 | Douady-Pleven et al. |
| 2016/0379403 | A1 | 12/2016 | Seiler |
| 2017/0019677 | A1 | 1/2017 | Sun et al. |
| 2017/0132833 | A1 | 5/2017 | Sathe |
| 2017/0206638 | A1 | 7/2017 | Fainstain |
| 2018/0205951 | A1 | 7/2018 | Hsiang et al. |
| 2020/0077122 | A1 | 3/2020 | Alakuijala et al. |

FOREIGN PATENT DOCUMENTS

| | | |
|---|---|---|
| CN | 106068648 A | 11/2016 |
| CN | 106105228 A | 11/2016 |
| CN | 106464772 A | 2/2017 |
| CN | 106576167 A | 4/2017 |
| CN | 106797483 A | 5/2017 |
| EP | 3319318 A1 | 5/2018 |
| JP | 2004088251 A | 3/2004 |
| JP | 2005354643 A | 12/2005 |
| JP | 2017535169 A | 11/2017 |
| WO | 2015192779 A1 | 12/2015 |

OTHER PUBLICATIONS

Final Office Action in U.S. Appl. No. 15/408,054, mailed Mar. 21, 2018, 15 pages.
Non-Final Office Action in U.S. Appl. No. 15/408,054, mailed Oct. 10, 2017, 11 pages.
Non-Final Office Action in U.S. Appl. No. 15/408,054, mailed Jul. 26, 2018, 14 pages.
International Search Report and Written Opinion in International Application No. PCT/IB2020/059179, mailed Jan. 4, 2021, 10 pages.
Notification of the First Office Action in Chinese Patent Application No. 202080068541.1, mailed Nov. 2, 2022, 12 pages.
Non-Final Office Action in Japanese Patent Application No. 2022-515817, mailed Jan. 31, 2023, 5 pages.
Notice of Allowance in Korean Patent Application No. 10-2022-7011453, mailed Aug. 29, 2023, 5 pages.
European Search report, European Application No. 20872274.4, dated Jun. 23, 2023, 11 pages.
Sun Yu-Chen et al "Improvements of HEVC SCC Palette Mode and Intra Block", IEEE Journal on Emerging and Selected Topics in Circuits and Systems, IEEE, Piscataway, JN, USA, vol. 6, No. 4, Dec. 1, 2016 (Dec. 1, 2016), pp. 433-445.

* cited by examiner

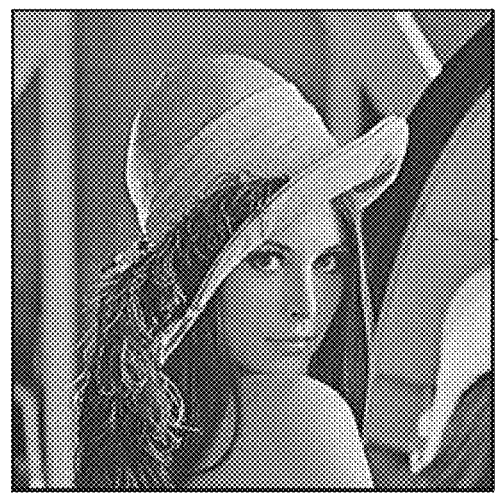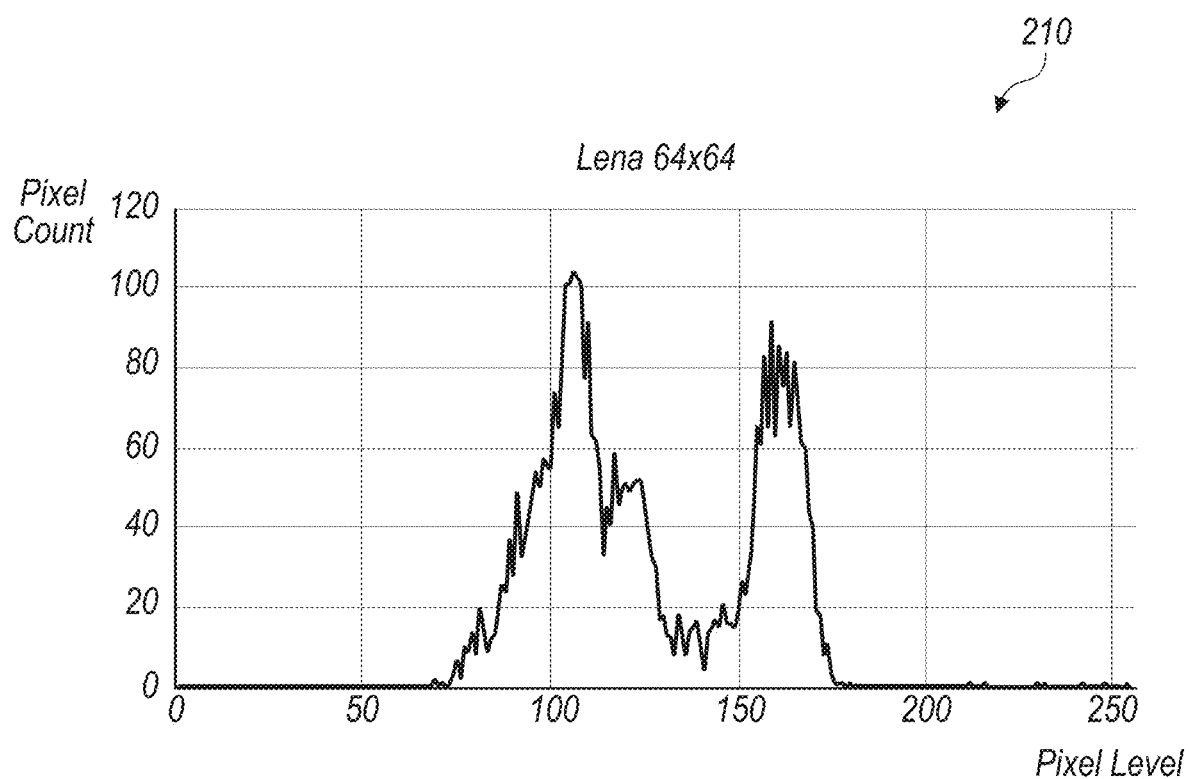
FIG. 2

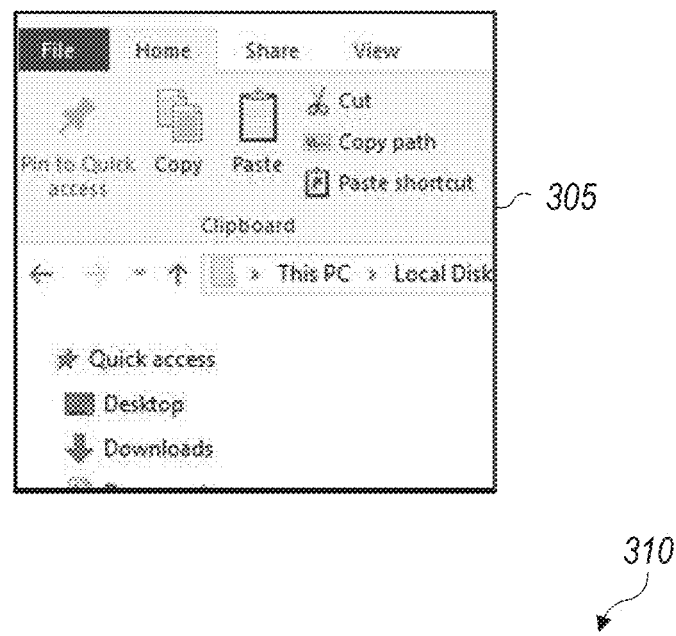
305
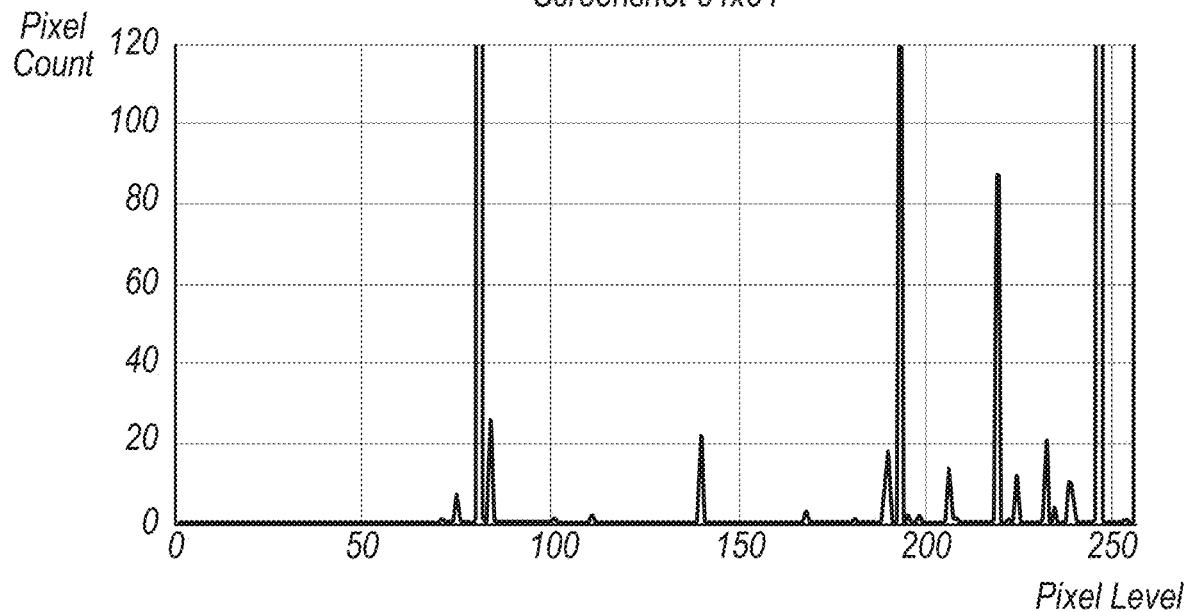
310
FIG. 3

1500

1505
Identify a Given Number of Most Frequently Occurring Pixel Component Values in a Block Using a Multi-Level Hierarchical Histogram Generation Process

1510
Select a Palette Table based on the Given Number of Most Frequently Occurring Pixel Component Values

1515
Create a Color Index Map with Index Values that Map Pixels of the Block to Entries in the Palette Table

1520
Encode the Palette Table and Color Index Map as a Representation of the Block

1525
Store and/or Convey to a Receiver the Encoded Palette Table and Color Index Map

*FIG. 15*

HIERARCHICAL HISTOGRAM CALCULATION WITH APPLICATION TO PALETTE TABLE DERIVATION

CROSS REFERENCE TO RELATED APPLICATIONS

This application is a continuation of U.S. patent application Ser. No. 16/588,772, now U.S. Pat. No. 11,076,151, entitled "HIERARCHICAL HISTOGRAM CALCULATION WITH APPLICATION TO PALETTE TABLE DERIVATION", filed Sep. 30, 2019, the entirety of which is incorporated herein by reference.

BACKGROUND

Description of the Related Art

Palette coding is used in several video compression standards (e.g., high efficiency video coding (HEVC) standard, Alliance for Open Media video 1 (AV1) coding standard) to increase the compressibility of the video data. Palette coding involves calculating and sorting a histogram to determine the candidate palette levels. The size of storage needed for histogram calculation for palette table derivation increases exponentially with the pixel bit depth. As used herein, the term "palette table" is defined as a data structure that stores a plurality of entries, with each entry storing an index which maps to a pixel component value. For 8-bit, 10-bit, and 12-bit video, the required number of histogram bins are 256, 1024, and 4096, respectively for traditional palette coding techniques.

BRIEF DESCRIPTION OF THE DRAWINGS

The advantages of the methods and mechanisms described herein may be better understood by referring to the following description in conjunction with the accompanying drawings, in which:

FIG. 2 is a diagram of an image and corresponding pixel distribution.

FIG. 3 is a diagram of a computer-generated screen content image and corresponding pixel distribution.

FIG. 15 is a generalized flow diagram illustrating one implementation of a method for encoding a video/image block using a palette table.

DETAILED DESCRIPTION OF IMPLEMENTATIONS

Figure 1:
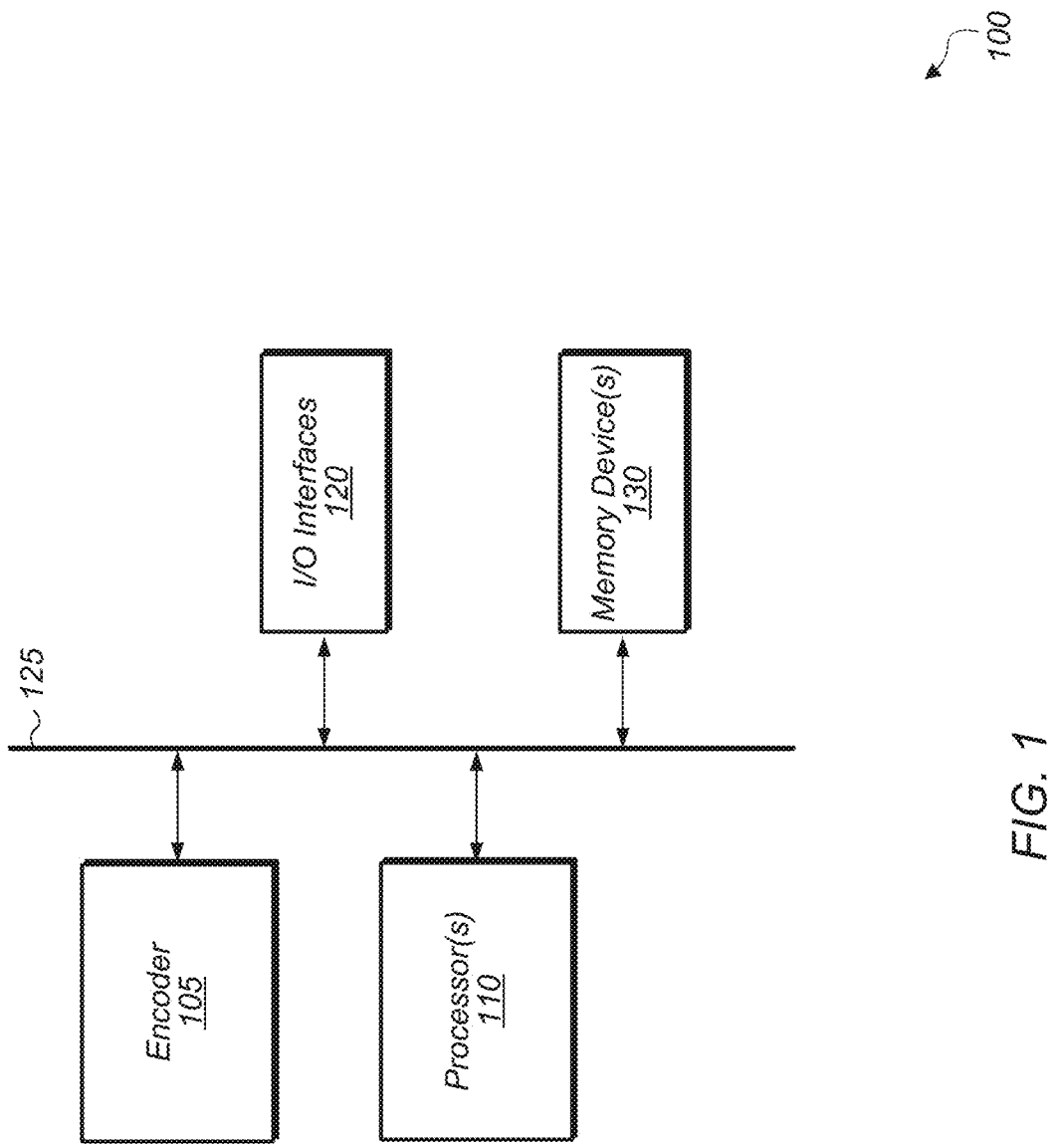
FIG. 1 is a block diagram of one implementation of a computing system.

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for implementing a hierarchical technique for palette table derivation are disclosed herein. In one implementation, an encoder calculates a first pass histogram for a first portion of most significant bits (MSBs) of pixel component values (i.e., color values) of a video frame. Then, the encoder selects a given number of the highest pixel count bins from the first pass histogram. As used herein, the term "bin" is defined as an interval which specifies one or more values. Bins are typically specified as consecutive, non-overlapping intervals of a variable. In this case, the variable is the pixel component value, and each bin specifies a range of values, with the size of the range determined by how many pixel component value bits fall outside the first portion of MSBs.

After selecting the given number of the highest pixel count bins from the first pass histogram, the encoder then increases the granularity of these selected highest pixel count bins by evaluating one or more additional bits from the pixel component values. A second pass histogram is then calculated for the concatenation of the original first portion of MSBs of the pixel component values and the one or more additional bits, and the highest pixel count bins are selected from the second pass histogram. A palette table is derived based on these highest pixel count bins from the second pass histogram, and the video frame is encoded using the palette table. By using the multi-pass histogram approach, the memory requirements are reduced as compared to traditional palette table derivation techniques.

In one implementation, the pixel bits are divided into several groups for hierarchical operation, starting with "m" most significant bits (MSBs) and expanding to the rest of the bits by adding "n1" bits, "n2 bits", and so on. A first histogram is calculated for the "m" MSBs, and then the top bins from this first histogram are selected. These top bins are expanded to include "n1" bits, and then a second histogram is calculated for these expanded bins. The top bins from the second histogram are selected, and these bins are expanded to include "n2" bits. In one implementation, this process continues until all of the pixel component value bits have been evaluated. It is assumed for the purposes of this discussion that "m", "n1", and "n2" are positive integers. It is noted that the values of "m", "n1", and "n2", the number of top bins that are selected, and the number of passes that are performed are flexible and can vary with the implementation. These values are adjusted based on a tradeoff between a simple hardware implementation and performance.

Referring now to FIG. 1, a block diagram of one implementation of a computing system 100 is shown. In one implementation, computing system 100 includes at least encoder 105, processor(s) 110, input/output (I/O) interfaces 120, bus 125, and memory device(s) 130. In other implementations, computing system 100 can include other components and/or computing system 100 can be arranged differently. In one implementation, encoder 105 includes logic for implementing a video codec. The video codec encodes uncompressed video streams and/or decodes compressed video streams. In one implementation, the video codec operates in accordance with one or more video compression standards. It is noted that as used herein, the terms "encoder" and "video codec" can refer to a video/image decoder, a video/image encoder, or a video codec. Encoder 105 is representative of any suitable combination of hardware and/or software. Although encoder 105 is shown as a separate unit distinct from processor(s) 110, it should be understood that a portion or the entirety of encoder 105 can execute or be implemented on processor(s) 110.

Processors(s) 110 are representative of any number and type of processing units (e.g., central processing unit (CPU), graphics processing unit (GPU), digital signal processor (DSP), field programmable gate array (FPGA), application specific integrated circuit (ASIC)). In one implementation, some of the processing associated with encoder 105 is performed by processor(s) 110. Memory device(s) 130 are representative of any number and type of memory devices. For example, the type of memory in memory device(s) 130 can include Dynamic Random Access Memory (DRAM), Static Random Access Memory (SRAM), NAND Flash memory, NOR flash memory, Ferroelectric Random Access Memory (FeRAM), or others. Memory device(s) 130 are accessible by encoder 105 and processor(s) 110. I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 120. Such peripheral devices include (but are not limited to) displays, keyboards, mice, printers, scanners, joysticks or other types of game controllers, media recording devices, external storage devices, network interface cards, and so forth.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Turning now to FIG. 2, a diagram of an image 205 and corresponding pixel distribution 210 is shown. The image 205 shown in FIG. 2 is the well-known Lena image which is widely used as a test image in image processing. The pixel distribution 210 for this 64×64 Lena image 205 is shown at the bottom of FIG. 2. The pixel distribution 210 illustrates how the pixels in image 205 are distributed across the different pixel values. Having a continuous color tone as shown in pixel distribution 210 is common for natural images or video frames captured by a camera.

Referring now to FIG. 3, a diagram of a computer-generated screen content image 305 and corresponding pixel distribution 310 is shown. Image 305 is one example of a computer-generated screenshot, and the pixel distribution 310 shows how there is a narrow distribution of pixels across a relatively small number of pixel component values. As shown in pixel distribution, image 305 includes a limited few distinct colors. This is a common type of distribution for computer-generated screen content, and for these types of computer-generated images, palette coding is an efficient way of encoding these images to achieve a high compression ratio. Other types of images besides computer-generated screenshots can also benefit from palette coding.

Figure 4:
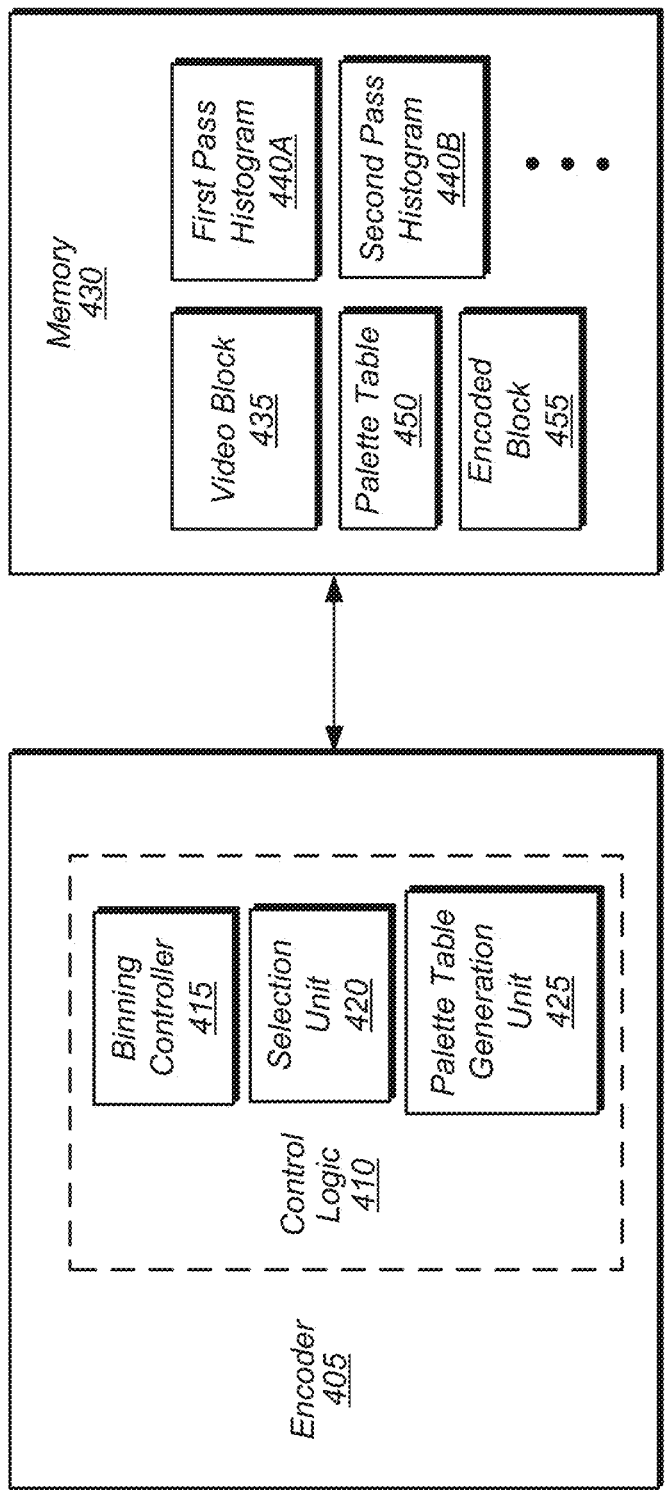
FIG. 4 is a block diagram of one implementation of an encoder coupled to a memory.

Turning now to FIG. 4, a block diagram of one implementation of an encoder 405 coupled to a memory 430 is shown. In one implementation, encoder 405 includes control logic 410 with binning controller 415, selection unit 420, and palette table generation unit 425. In another implementation, encoder 405 is implemented by a processor executing program instructions, and in this implementation, binning controller 415, selection unit 420, and palette table generation unit 425 are implemented by program instructions rather than with control logic. In other implementations, binning controller 415, selection unit 420, and palette table generation unit 425 are implemented using a combination of hardware and software.

Encoder 405 is coupled to memory 430, which is representative of any number and type of memory devices. In one implementation, memory 430 stores a video frame which will be encoded by encoder 405. Video block 435 is representative of one of the blocks of this video frame. The techniques used for encoding video block 435 can be used for the other blocks of the video frame, and for other video frames in the video sequence. Alternatively, video block 435 can be a single block of an image. In one implementation, video block 435 is stored as a plurality of pixel component values in memory 430. As part of the encoding process, binning controller 415 creates first pass histogram 440A from the pixel component values of video block 435. In one implementation, binning controller 415 creates a separate first pass histogram 440A for each separate pixel component (e.g., red, green, blue). To create first pass histogram 440A, the first step performed by binning controller 415 is to divide the entire range of pixel component values into a series of intervals. This first step is also referred to as "binning" the range of values, with each interval referred to as a "bin". The bins are typically specified as consecutive, non-overlapping intervals of the range of values. Next, binning controller 415 counts how many pixel component values from video block 435 fall into each interval. For example, in one implementation, binning controller 415 retrieves the pixel component values of video block 435, and then binning controller 415 allocates each pixel component value to its corresponding bin. In one implementation, each bin is implemented using a counter which is incremented each time that a pixel is allocated to the respective bin.

In one implementation, each bin of first pass histogram 440A represents a range of pixel component values corresponding to a given number of MSBs. The given number of MSBs can vary according to the implementation. For example, in one implementation, each bin of first pass histogram 440A represents a range corresponding to six MSBs out of a total of eight bits per pixel component value.

By using less than the total number of bits to generate the bins of first pass histogram 440A, the storage requirements for storing first pass histogram 440A in memory 430 are reduced. For example, if six MSBs out of eight bits are used to generate first pass histogram 440A, then only 64 bins are created as compared to 256 bins if all eight bits were used. In this example, each pixel component value is allocated to its respective bin by binning controller 415 based on the value's 6 MSBs. In other implementations, larger amounts of storage savings can be attained for higher bit-depth video (e.g., 12 bits per sample, 16 bits per sample) and/or if more pixel component value bits are excluded from the bin classification.

After first pass histogram 440A is generated and stored in memory 430, the bins of first pass histogram 440A are sorted by selection unit 420. For example, the bins are sorted from highest to lowest based on how many pixel values fall into each bin. Then, selection unit 420 selects a given number of the bins that have the most pixel values. For example, in one implementation, selection unit 420 selects the eight bins that have the most pixel values. In other implementations, selection unit 420 selects other numbers of bins that have the highest pixel count (i.e., highest number of pixel values) among all of the bins in first pass histogram 440A. Next, the number of bits being evaluated are expanded for these selected bins and then second pass histogram 440B is generated for the expanded bins. For example, if the top eight bins are selected by selection unit 420, and these bins are expanded by two bits, then second pass histogram 440B will have a total of 32 bins. These bins are then sorted according to how many pixel values fall into each bin. Then, the top bins are selected according to the pixel value count. The number of top bins that are selected varies according to the implementation.

In one implementation, the top bins that are selected from second pass histogram 440B are used by palette table generation unit 425 to derive the palette table 450 that is used for encoding video block 435 to create encoded block 455. Alternatively, one or more additional passes can be performed to generate more histograms by expanding the number of bits that are evaluated for the pixel component values. In some cases, encoder 405 will decide not to use palette mode encoding for video block 435 if the distribution of pixel values are spread across a large number of bins as is commonly found in natural (i.e., non-computer-generated) video frames. In one implementation, the decision not to use palette mode encoding is made after first pass histogram 440A is generated. An analysis of first pass histogram 440A can determine whether palette mode encoding is suitable for video block 435. In cases where palette mode encoding is not used, any of various other types of conventional encoding techniques can be used to encode video block 435.

It is noted that the above-described process can be performed on the entirety of a video frame or a portion thereof. Also, a palette table that is generated for an entire video frame can be used for encoding subsequent video frames in the video stream. It is also noted that video block 435 can be a block of an image in another implementation. It should be understood that the partitioning of control logic 410 into binning controller 415, selection unit 420, and palette table generation unit 425 is merely indicative of one implementation. In another implementation, a single control unit can perform the functions of binning controller 415, selection unit 420, and palette table generation unit 425. In other implementations, other ways of partitioning control logic 410 into separate units can be deployed.

In one implementation, encoded block 455 includes an encoded version of palette table 450 and a color index map with index values that map pixels of video block 435 to palette table 450. Palette table 450 is representative of any number of palette tables for encoding the pixel components of video block 435. For example, in one implementation, palette table 450 includes a first table for the red component, a second table for the green component, and a third table for the blue component. In another implementation, palette table 450 is a single table that represents a combination of the different pixel components. The color index map that is generated can be encoded using any suitable encoding technique. For example, the individual index values are encoded using a run-length encoding technique in one implementation. Other ways of encoding the individual index values are possible and are contemplated.

Figure 5:
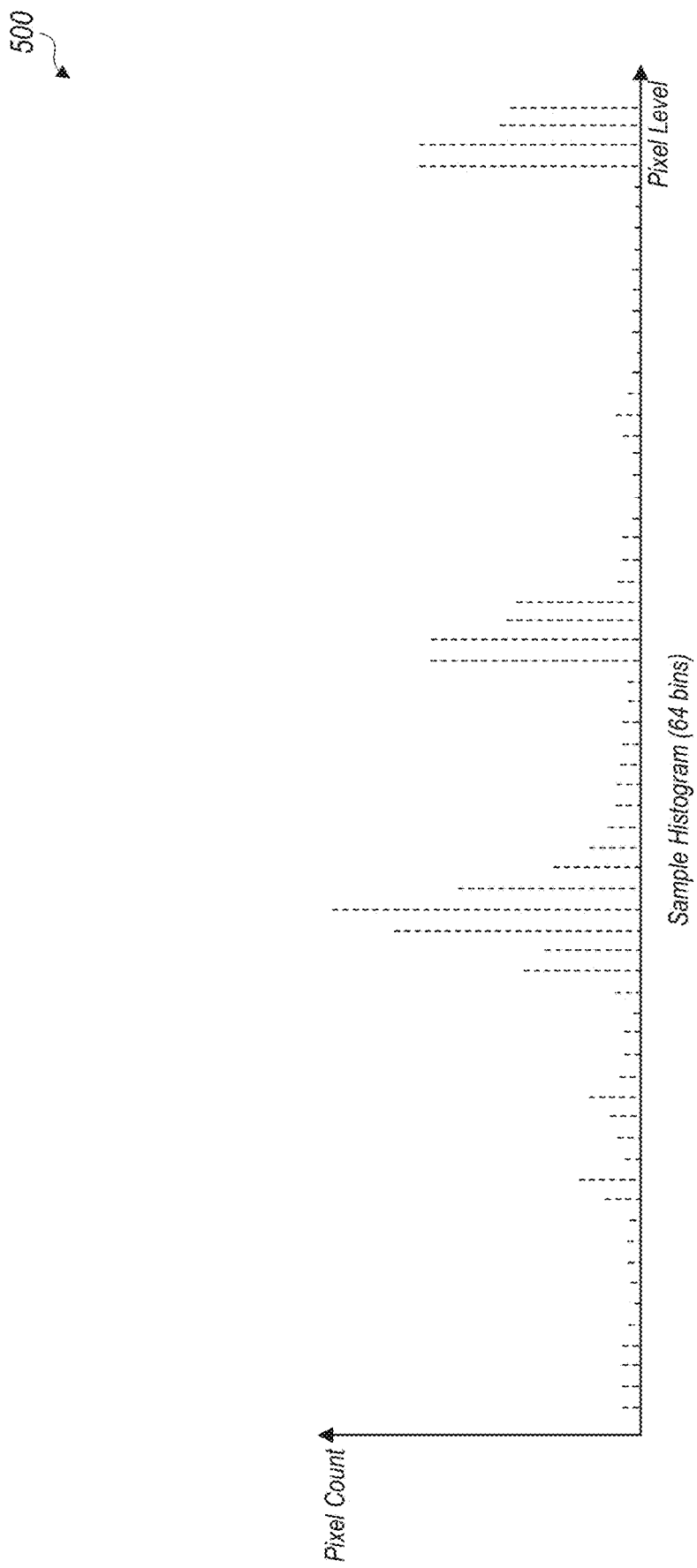
FIG. 5 illustrates a sample histogram for a given block in accordance with one implementation.

Referring now to FIG. 5, one implementation of a sample histogram 500 for a given block is shown. Histogram 500 is one example of a histogram with 64 different bins corresponding to 64 possible pixel levels. As used herein, the term "histogram" is defined as an occurrence frequency of each pixel component value for a given block of an image/frame. It is noted that a block can be referred to more generally as a "coding unit", with the size of the coding unit varying according to the implementation. In one implementation, a coding unit is an 8×8 block of pixels. In another implementation, a coding unit is the entirety of the image/frame. In other implementation, a coding unit can be other sizes and/or arrangements of pixels. The example distribution of histogram 500 is shown for illustrative purposes only. The Y-axis measures the number of pixels in the given block which have the corresponding pixel level. It is assumed for the purposes of this discussion that the given block has a plurality of pixels and each pixel has a numerical value for each of one or more channels (e.g., red, green, blue).

To generate histogram 500, storage for 64 separate bins is required. For other histograms with other numbers of bits per pixel component, other numbers of bins would be required when generating a histogram for every possible pixel level. For example, for a 10-bit pixel component, 1024 storage bins would be needed. For a 12-bit pixel component, 4096 storage bins would be needed. As the number of bits per pixel component level increases, the storage requirements increase exponentially.

Figure 6:
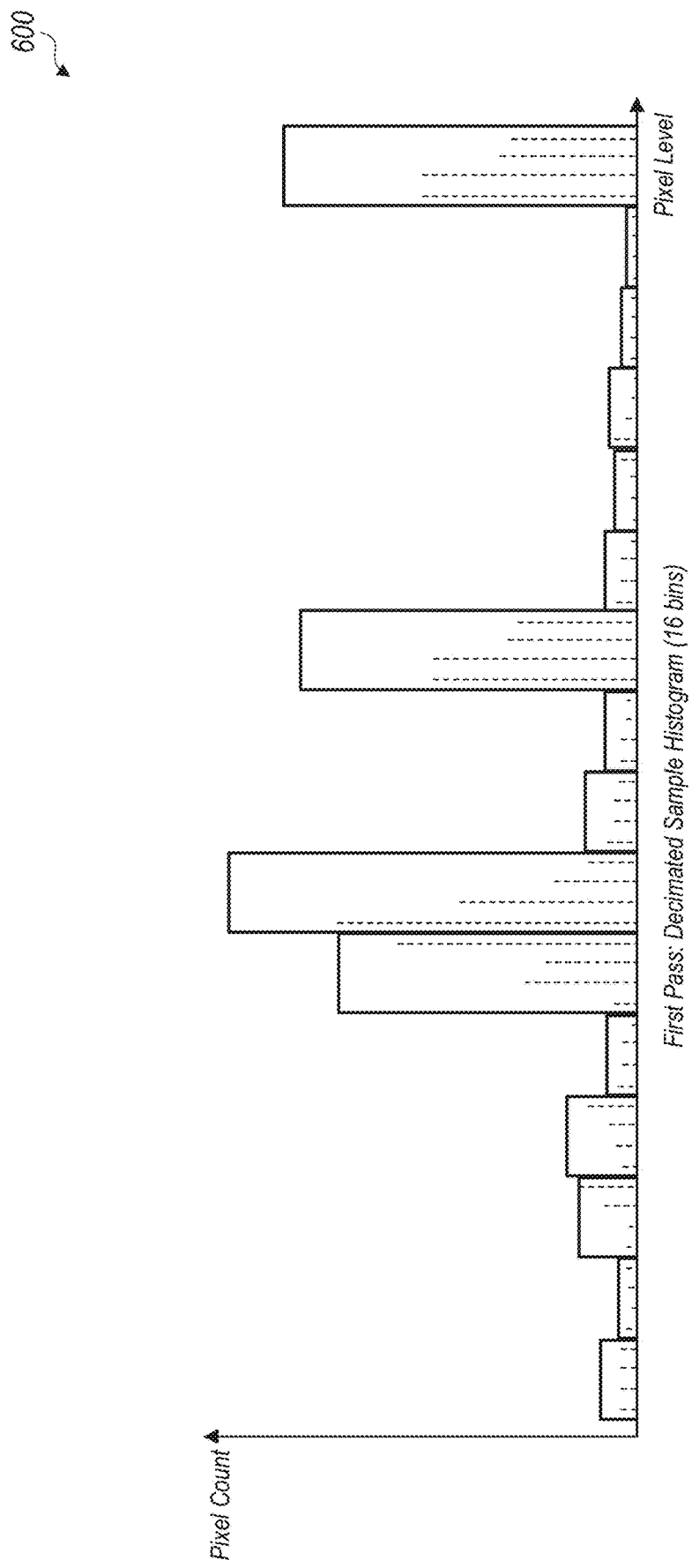
FIG. 6 illustrates a decimated sample histogram for a given block after a first pass in accordance with one implementation.

Turning now to FIG. 6, a diagram of one implementation of a decimated sample histogram 600 for a given block after a first pass is shown. The discussion of FIG. 6 is a continuation of the discussion of histogram 500 from FIG. 5. Histogram 600 includes the same distribution of pixels across pixel component levels as was shown in histogram 500, except that now each bin encompasses a plurality of pixel component levels. Accordingly, histogram 600 has a reduced number of bins by evaluating only a subset of the bits of each pixel.

As shown in histogram 600, each rectangle is an intermediate bin which is the congregation of four bins. In this example, histogram 600 evaluates the four most significant bits (MSBs) of the pixel component values. Using only four MSBs corresponds to a total of 16 bins. This helps to reduce the storage requirements of 64 bins (for histogram 500 of FIG. 5) to 16 bins for histogram 600. In other implementations, a first pass histogram can evaluate other numbers of MSBs.

Figure 7:
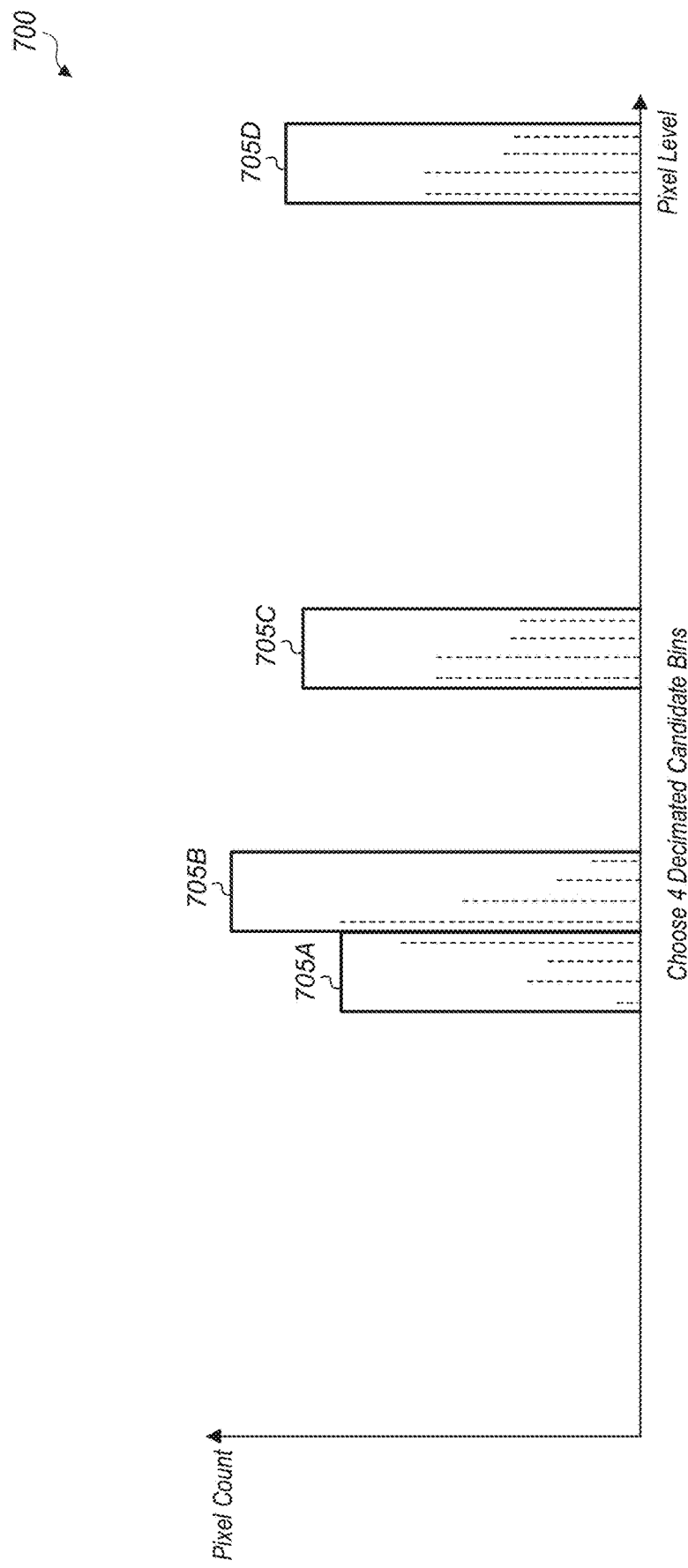
FIG. 7 illustrates a selection of the top decimated candidate bins in accordance with one implementation.

Referring now to FIG. 7, a diagram of one implementation of a selection of the top decimated candidate bins from a sample histogram is shown. The discussion of FIG. 7 is a continuation of the discussion of histogram 600 from FIG.

6. After creating candidate bins based on a subset of pixel MSBs as shown in histogram 600, the top four candidate bins with the highest pixel counts are selected. These four selected decimated candidate bins 705A-D are shown as the vertical rectangles in histogram 700. It should be understood that the selection of the top four decimated candidate bins 705A-D is merely indicative of one implementation. In other implementations, another number (e.g., 2, 8) of the top decimated candidate bins can be selected from the decimated histogram.

Figure 8:
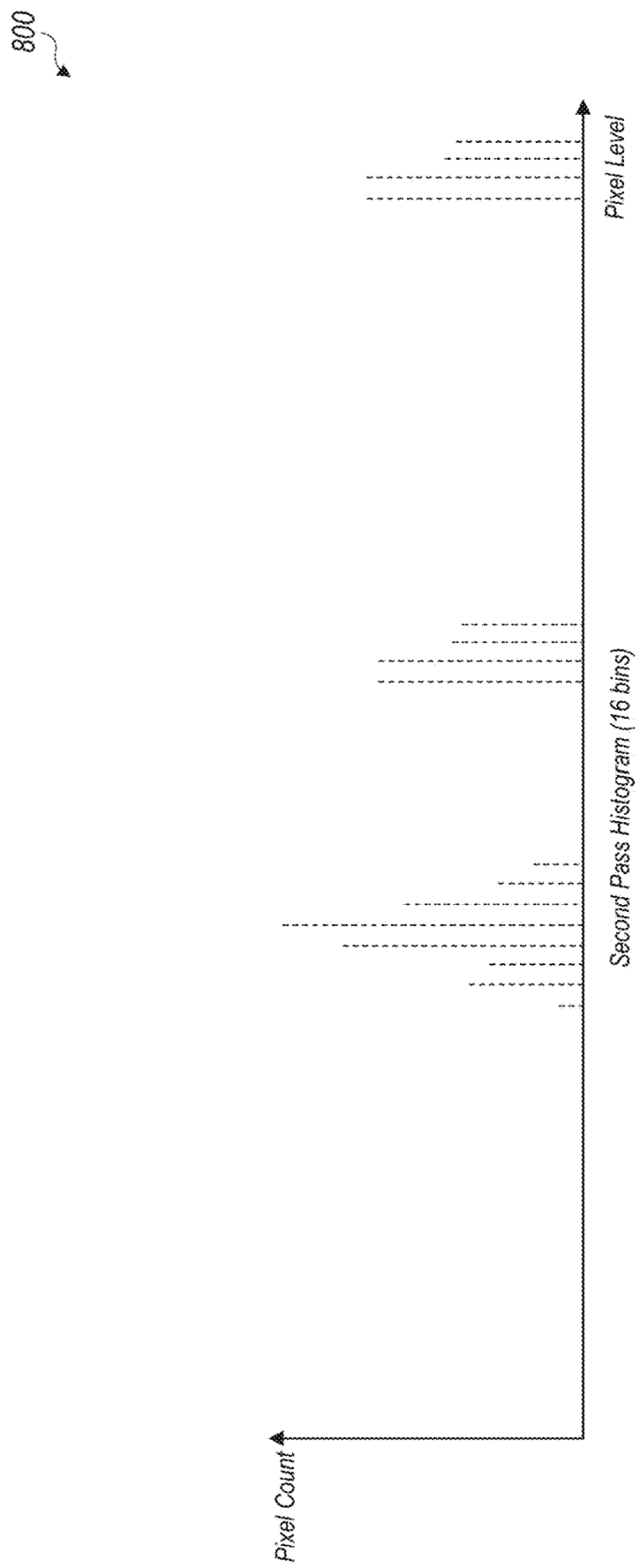
FIG. 8 illustrates a second pass histogram in accordance with one implementation.

Turning now to FIG. 8, a diagram of one implementation of a second pass histogram 800 is shown. The discussion of FIG. 8 is a continuation of the discussion of histogram 700 from FIG. 7. After selecting the top four candidate bins 705A-D as shown in histogram 700, histogram 800 is refined by adding two additional bits to the pixel component bits being evaluated. This increases the number of bins from four to 16. In one implementation, for an 8-bit image or video frame, the multi-pass histogram process will stop at this point and the palette table will be derived from the top 8 bins of these 16 bins. For images with more than 8 bits per pixel component, the process will continue with another pass by choosing the top candidate bins and then expanding these bins by an additional two bits. The number of candidate bits that are selected can vary according to the implementation.

Figure 9:
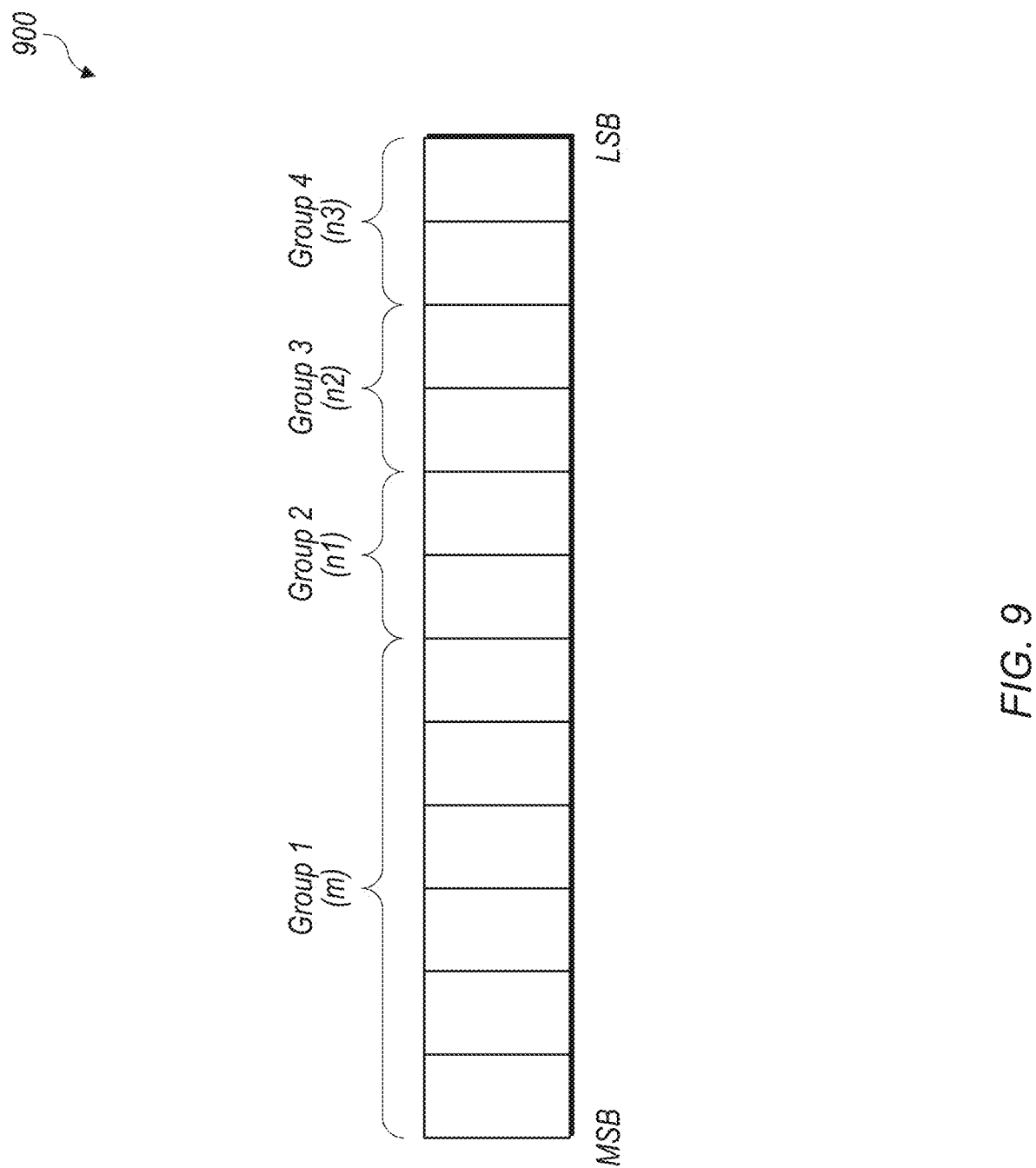
FIG. 9 is a diagram of one implementation of the bits of a pixel component.

Referring now to FIG. 9, a diagram of one implementation of the bits of a pixel component 900 is shown. Pixel component 900 is representative of any number of bits for storing one of the different color values for the particular color space of the source image or video frame. For example, in one implementation, three separate instances of pixel component 900 are used to encode the red, green, and blue color values for each pixel for an image in the red, green, and blue (RGB) color space. Alternatively, in another implementation, three separate instances of pixel component 900 encode the luminance and chrominance values for each pixel in the (YUV) color space. In other implementations, pixel component 900 can store each pixel component of the pixels in other types of color spaces. More generally, pixel component 900 can be referred to as an index into a color space.

In one implementation, a first pass histogram is calculated for a block of an image/frame using the "m" group 1 bits of pixel component 900 while excluding the other least significant bits (LSBs) of pixel component 900. As shown, "m" is equal to six, but it should be understood this is merely indicative of one implementation. The top "p1" candidate bins are chosen from the candidate bins for this first pass histogram, with the value of "p1" varying according to the implementation. Next, a second pass histogram is calculated for these "p1" candidate bins by expanding the "p1" candidate bins to include the "n1" group 2 bits in the histogram calculation. As shown, "n1" is equal to two, but it should be understood this is merely indicative of one implementation. The top "p2" candidate bins are chosen from the second pass histogram, with the value of "p2" varying according to the implementation. Additional passes can be performed for the "n2" group 3 bits and the "n3" group 4 bits. In one implementation, after all of the bits of pixel component 900 have been evaluated, the palette table is derived using the top bins from the final set of bins.

Figure 10:
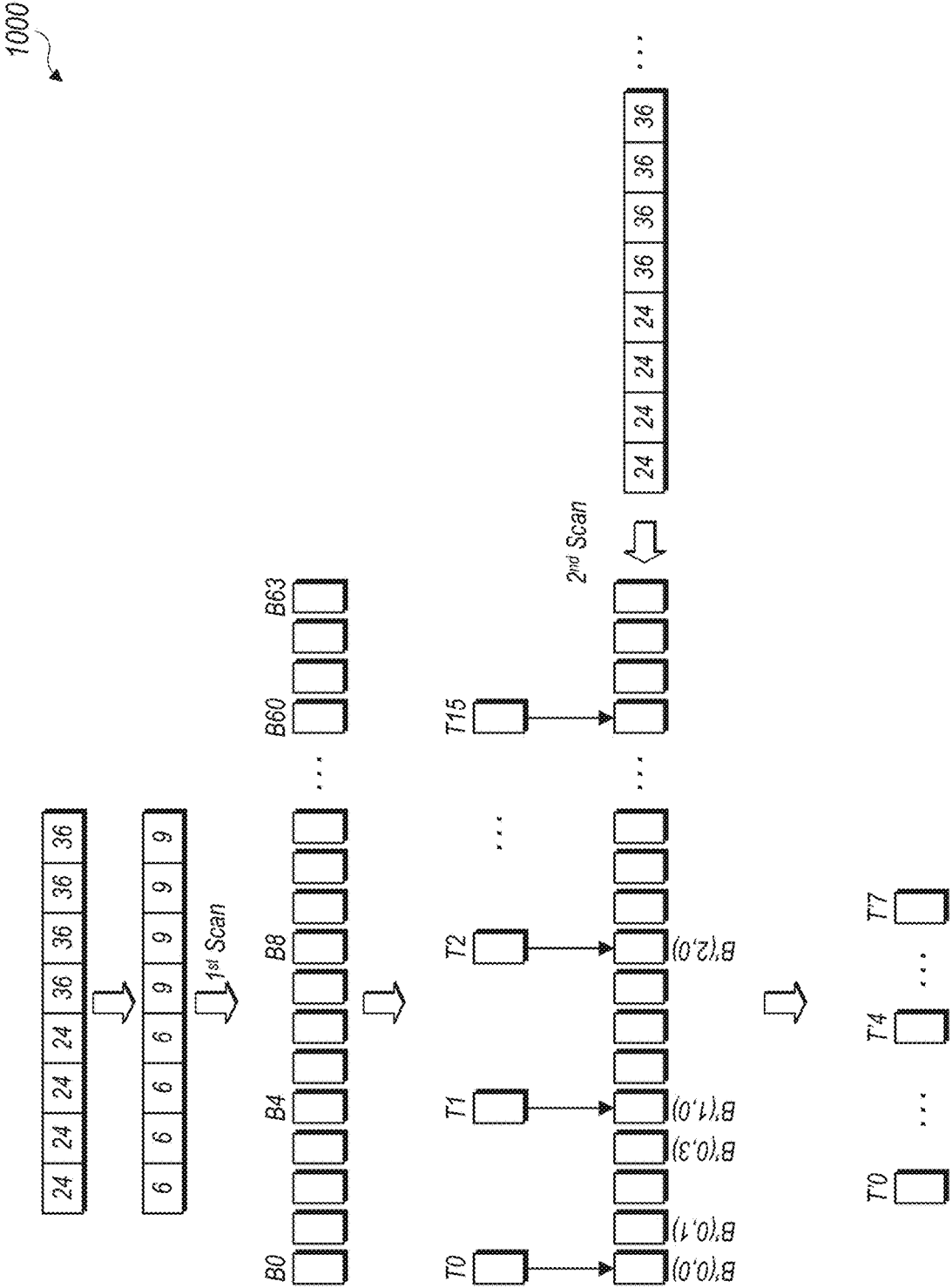
FIG. 10 is a block diagram of one implementation of a process for generating dual-pass histograms for palette table derivation.

Turning now to FIG. 10, a block diagram of one implementation of a process 1000 for generating dual-pass histograms for palette table derivation is shown. The first step in the process 1000 is to reduce the number of bits that are evaluated when generating the first histogram. This increases the number of pixel component values that fall into each bin. For example, if two bits are excluded, then four potential pixel component values will fall into each bin. This is the example shown at the top of process 1000. For the first scan, the histogram has only 64 bins (B0-B63) corresponding to the six MSBs. Then, the top 16 bins (T0-T15) are selected from bins B0-B63. The top 16 bins are the bins with the most pixel component values from the block being processed.

After the top 16 bins are selected, which are shown as T0-T15 in FIG. 10, each bin is expanded into four bins by evaluating an additional two LSBs from the pixel component values for the second scan. These bins are shown as B'(0,0), B'(0,1), B'(0,2), and B'(0,3) for T0. For T1, the bins are B'(1,0), B'(1,1), B'(1,2), and B'(1,3) for the second scan. The other bins of the second scan follow the same pattern for the other top bins T2-T15 from the first scan. As a result of the second scan, the top 16 bins are expanded into 64 bins. These 64 bins are sorted and then the top 8 bins (T'0-T'7) are selected. It is noted that the specific number of top bins that are selected from the second scan is merely indicative of one implementation. Likewise, the other values used for process 1000 are merely indicative of one particular implementation. Other implementations can use other values.

Figure 11:
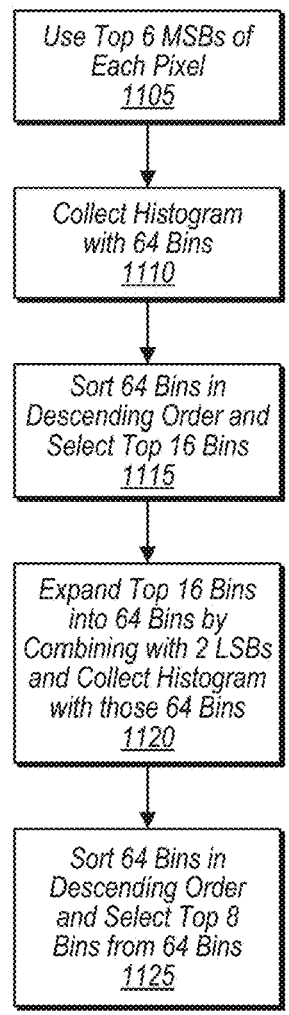
FIG. 11 is a generalized flow diagram illustrating one implementation of a method for generating multi-pass histograms for palette table derivation.

Referring now to FIG. 11, one implementation of a method 1100 for generating multi-pass histograms for palette table derivation is shown. For purposes of discussion, the steps in this implementation and those of FIG. 12-15 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 1100. It is noted that method 1100 is intended to correspond to the process 1000 (of FIG. 10).

When method 1100 is initiated, an encoder uses the top 6 MSBs of each pixel component value (block 1105). Next, the encoder collects a histogram with 64 bins for the top 6 MSBs of the pixel component values (block 1110). Then, the encoder sorts the 64 bins in descending order and selects the top 16 bins from these 64 bins (block 1115). Next, the encoder expands the top 16 bins into 64 bins by combining the 6 MSBs with 2 LSBs and then the encoder collects a histogram with those 64 bins (block 1120). The encoder sorts the 64 bins in descending order and selects the top 8 bins from the 64 bins (block 1125). After block 1125, method 1100 ends. These selected 8 bins are then used by the encoder for the palette table derivation when encoding the corresponding block.

Figure 12:
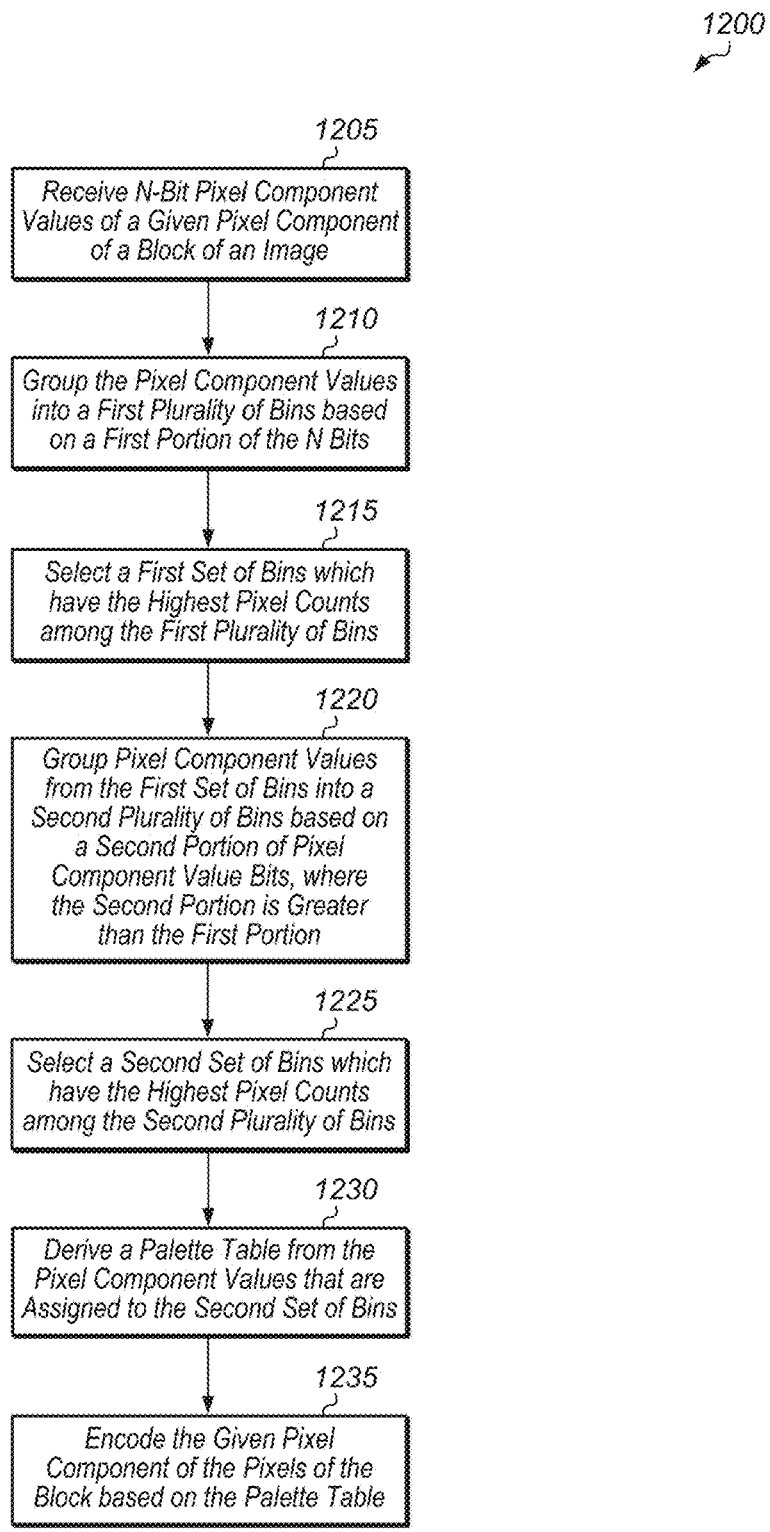
FIG. 12 is a generalized flow diagram illustrating one implementation of a method for generating multiple histogram passes as part of palette table derivation.

Turning now to FIG. 12, one implementation of a method 1200 for generating multiple histogram passes as part of palette table derivation is shown. An encoder receives N-bit pixel component values of a given pixel component of a block of an image (block 1205). It is noted that the block can be referred to more generally as a "coding unit" and that the image can be a video frame. The size of the coding unit (e.g., 8×8 block) can vary according to the implementation. In another implementation, the coding unit is the entirety of an image or video frame. In other implementations, the coding unit is any of various other portions of the image, or the coding unit can correspond to multiple images (e.g., video frames of a video sequence). It is assumed for the purposes of this discussion that "N" is a positive integer. The value of N can vary according to the implementation. For example, 8-bit, 10-bit, and 12-bit pixel components are commonly used values in various implementations. Other numbers of bits per pixel component are also possible. In one implementation, the given pixel component is one of red, green, or blue for the RGB color space. In another implementation, the given pixel component represents the luminance or chrominance values for a YUV or YCbCr color space. Other types of pixel components can be used in other implementations.

Next, the encoder groups the pixel component values into a first plurality of bins based on a first portion of the N pixel component value bits (block 1210). The first plurality of bins collectively represent a histogram of pixel values for the block. Each bin includes those pixel component values which match the first portion of bits assigned to the bin. For example, in one implementation, N is eight and the first portion is six bits, and a first bin is assigned bits "111111", a second bin is assigned bits "111110", and so on. Pixel component values of "11111111", "11111110", "11111101", and "11111100" are assigned to the first bin, pixel component values of "11111011", "11111010", "11111001", and "11111000" are assigned to the second bin, and so on. In other implementations, N is other numbers and/or the first portion includes another number of bits.

Then, the encoder selects a first set of bins which have the highest pixel counts among the first plurality of bins (block 1215). For example, in one implementation, the encoder selects the eight bins with the highest pixel counts in block 1215. In another implementation, the encoder selects the 16 bins that have the highest pixel counts in block 1215. In other implementations, the encoder selects some other number of bins with the highest pixel counts.

Next, the encoder groups pixel component values from the first set of bins into a second plurality of bins based on a second portion of pixel component value bits, where the second portion is greater than the first portion (block 1220). In other words, in block 1220, the encoder expands the first set of bins into the second plurality of bins by increasing the number of bits that are used to sort pixel component values into bins. However, the second plurality of bins are all contained within the first set of bins, so the increase in the number of bits only applies to those pixel component values that were grouped into the first set of bins. In one implementation, the second portion is greater than the first portion by two bits. In other implementations, the second portion is greater than the first portion by other numbers of bits.

Then, the encoder selects a second set of bins which have the highest pixel counts among the second plurality of bins (block 1225). The number of bins that are in the second set of bins varies according to the implementation. Next, the encoder derives a palette table from the pixel component values that are assigned to the second set of bins (block 1230). Then, the encoder encodes the given pixel component of the pixels of the block based on the palette table (block 1235). After block 1235, method 1200 ends. By using method 1200, the storage requirements for generating histograms for palette table encoding are reduced since a smaller number of bins are calculated than would otherwise be calculated if traditional techniques were used. It is noted that method 1200 can be performed for each pixel component of the block. Subsequent blocks of the image can be encoded in a similar matter, or the palette table can be reused for other blocks.

Figure 13:
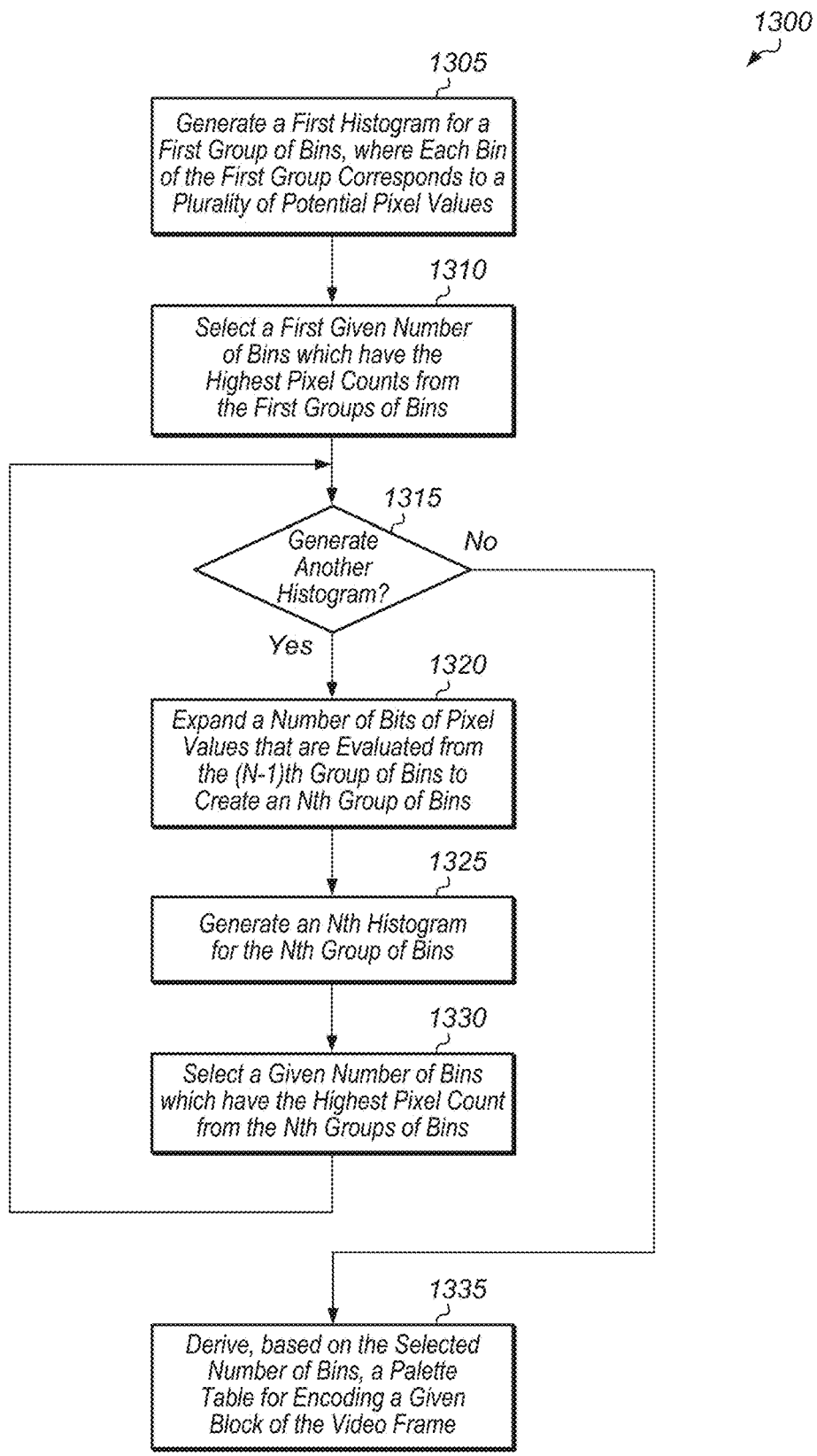
FIG. 13 is a generalized flow diagram illustrating one implementation of a method for generating multiple histogram passes for palette table derivation.

Referring now to FIG. 13, one implementation of a method 1300 for generating multiple histogram passes for palette table derivation is shown. An encoder generates a first histogram for a first group of bins, where each bin of the first group corresponds to a plurality of potential pixel values (block 1305). It is noted that the number of potential pixel values per bin depends on how many bits were not evaluated for the first histogram. For example, if the video frame has 12 bits per pixel, and only six MSBs were evaluated in the first histogram, then six LSBs are left over, meaning there are 64 potential pixel values per bin. Other implementations will have other numbers of potential pixel values per bin after the first histogram.

Next, the encoder selects a first given number of bins which have the highest pixel counts from the first group of bins (block 1310). The first given number can vary according to the implementation. Then, the encoder determines if another histogram should be generated (conditional block 1315). For example, in one implementation, if there are more bits in the pixel component values that have not yet been evaluated, then the encoder can decide to generate another histogram.

If the encoder determines that another histogram should be generated (conditional block 1315, "yes" leg), then the encoder expands a number of bits of pixel values that are evaluated from the (N−1)th group of bins to create an Nth group of bins (block 1320). The Nth group refers to the second group, third group, fourth group, and so on, depending on how many histograms have already been generated. Otherwise, if the encoder determines that another histogram should not be generated (conditional block 1315, "no" leg), then the encoder derives, based on the selected number of bins, a palette table for encoding a given block of the video frame (block 1335).

After block 1320, the encoder generates another (i.e., Nth) histogram for the Nth group of bins (block 1325). Then, the encoder selects a given number of bins which have the highest pixel counts from the Nth group of bins (block 1330). The given number can vary according to the implementation and/or according to the specific hierarchical level of the histogram being generated. After block 1330, method 1300 returns to conditional block 1315.

Figure 14:
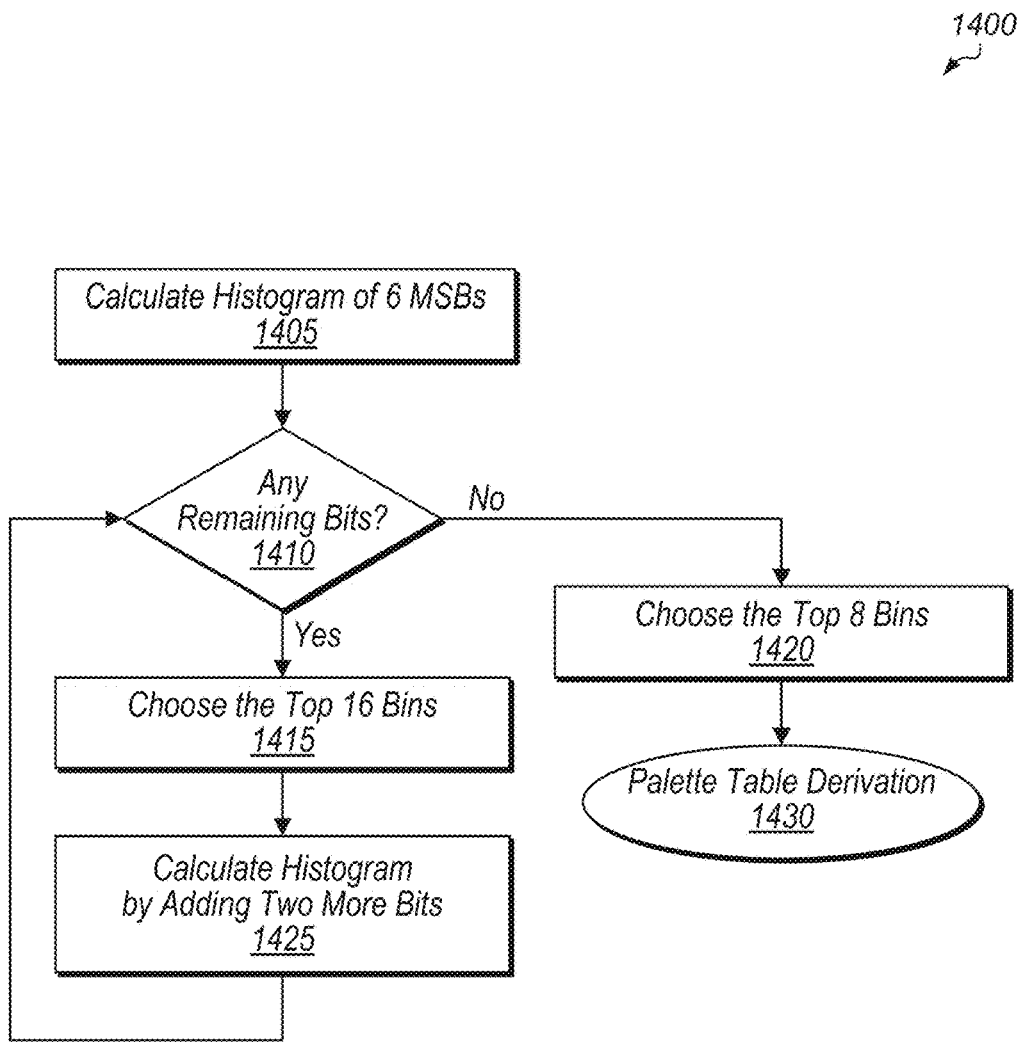
FIG. 14 is a generalized flow diagram illustrating one implementation of a method for calculating multi-pass histograms for palette table derivation.

Turning now to FIG. 14, another implementation of a method 1400 for calculating multi-pass histograms for palette table derivation is shown. An encoder calculates a histogram of the six most significant bits (MSBs) of pixel component values (block 1405). It is noted that the histogram includes a plurality of bins, with each bin including a count of the number of pixels that have a pixel component value with the same six MSBs corresponding to the bin. Next, the encoder determines if there are any remaining bits in the pixel component values (conditional block 1410). For example, after block 1405, if the pixel component values have eight bits, then there are two more bits left after the six MSBs, and so conditional block 1410 would evaluate to "Yes".

If there are any remaining bits in the pixel component values (conditional block 1410, "yes" leg), then the encoder chooses the top 16 bins of the plurality of bins from the histogram (block 1415). In other implementations, the encoder chooses some other number of bins which have the most pixels. Otherwise, if there are no remaining bits in the pixel component values (conditional block 1410, "no" leg), then the encoder chooses the top 8 bins of the plurality of bins from the histogram (block 1420). These top 8 bins correspond to the most prominent colors in the block. After block 1420, the top 8 bins are used for the palette table derivation (block 1430), and then method 1400 ends. After block 1415, the encoder calculates the histogram by adding two more bits (block 1425). After block 1425, method 1400 returns to conditional block 1410. It is noted that the specified numbers of bits and numbers of bins specified in method 1400 are indicative of one particular implementation. In other implementations, these numbers can vary.

Referring now to FIG. 15, one implementation of a method 1500 for encoding a video/image block using a palette table is shown. An encoder identifies a given number of most frequently occurring pixel component values in a block using a multi-level hierarchical histogram generation process (block 1505). Different examples of using a multi-level hierarchical histogram generation process to identify a given number of most frequently occurring pixel component values (i.e., the most prominent colors) in a block are described in methods 1100, 1200, 1300 and 1400 (of FIG. 11-14). Any of these methods, or other similar methods, can be used to implement block 1505. The given number can be any suitable integer value (e.g., 8, 16, 32), with the value varying according to the implementation.

Next, the encoder selects a palette table based on the given number of most frequently occurring pixel component values (block 1510). In one implementation, the palette table includes the seven most frequently occurring pixel component values, allowing the index into the table to be encoded with three bits, with the eighth index used for escape pixels which do not map to any values in the palette table. In other implementations, the palette table has other numbers of entries for other numbers of the most frequently occurring pixel component values. In one implementation, each pixel component (e.g., luminance, chrominance) has its own palette table. In another implementation, a single palette table is created as a representative combination of the separate pixel components. In a further implementation, the palette table is selected for a single pixel component (e.g., red) and then shared and/or modified to be used with the other pixel components (e.g., blue, green). Alternatives to the above are possible and are contemplated.

Then, a color index map is created with index values that map pixels of the block to entries in the palette table (block 1515). For example, each pixel in the block is converted to an index into the palette table, with the color index map including an index for each pixel in the block. If the pixel has a value that is not included within the palette table, then the pixel can be encoded as an escape pixel, and the actual value of the pixel can be included in the color index map or in a separate structure. Next, the palette table and color index map are encoded as a representation of the block (block 1520). Any of various encoding techniques for encoding the palette table and for encoding the color index map can be used. Then, the encoded palette table and color index map are stored and/or conveyed to a receiver (block 1525). After block 1525, method 1500 ends. It should be understood that method 1500 can also be used to encode the entirety of an image or video frame rather than just a block of the image/frame.

For implementations that involve sending the encoded palette table and color index map to a receiver, the receiver will include a decoder that will reverse the above steps to recreate the block from the encoded palette table and color index map. The recreated block can then be driven to a display. In one implementation, this process can be repeated for the blocks of each video frame of a video sequence. Alternatively, the encoded palette table can be sent for the entirety of a first video frame, and then some number of subsequent video frames can reuse this palette table. For the subsequent video frames, only the color index map for the video frame is sent to the receiver. In a further implementation, an encoded palette table generated for a block of a frame is reused for other blocks of the frame and/or blocks of other frames. In some cases, a palette table for a given block is derived from the palette table corresponding to another block. For example, in one implementation, a delta palette table (i.e., difference palette table) is applied to the palette table of a neighboring block to generate the palette table for a given block. Other ways of deriving a new palette table from a previously used palette table are possible and are contemplated.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An encoder circuit comprising:
   circuitry configured to:
   receive a plurality of pixels represented by a plurality of pixel component values, each of the pixel component values comprising a number of bits to indicate one of a plurality of color values;
   generate a first distribution of the pixel component values based on a first number of bits of each of the pixel component values;
   generate a second distribution of the pixel component values based on a second number of bits of each of the pixel component values, the second number of bits being different from the first number of bits, in response to determining all bits of the pixel component values have not been considered; and
   generate a palette table, in response to determining all bits of the pixel component values have been considered.

2. The encoder circuit as recited in claim 1, wherein the circuitry is further configured to create a color index map that maps pixel component values to entries of the palette table.

3. The encoder circuit as recited in claim 2, wherein the second number of bits is greater than the first number of bits.

4. The encoder circuit as recited in claim 1, wherein the circuitry is configured to repeatedly determine distributions of pixel component values until all bits of the pixel component values have been considered.

5. The encoder circuit as recited in claim 1, wherein the circuitry is further configured to select the number of pixel component values based on counts of the pixel component values in the plurality of pixels.

6. The encoder circuit as recited in claim 1, wherein the circuitry is further configured to determine a first histogram based on the first number of bits of the pixel component values that is less than a total number of bits of the pixel component values.

7. The encoder circuit as recited in claim 6, wherein the circuitry is further configured to determine a second histogram based on the second distribution.

8. A method comprising:
receiving a plurality of pixels represented by a plurality of pixel component values, each of the pixel component values comprising a number of bits to indicate one of a plurality of color values;
generating, by an encoder, a first distribution of the pixel component values based on a first number of bits of each of the pixel component values;
generating, by the encoder, a second distribution of the pixel component values based on a second number of bits of each of the pixel component values, the second number of bits being different from the first number of bits, in response to determining all bits of the pixel component values have not been considered; and
generating a palette table, by the encoder, in response to determining all bits of the pixel component values have been considered.

9. The method as recited in claim 8, further comprising creating, by the encoder, a color index map that maps pixel component values to entries of the palette table.

10. The method as recited in claim 8, wherein the second number of bits is greater than the first number of bits.

11. The method as recited in claim 8, further comprising dividing the first distribution of pixel component values into a plurality of bins.

12. The method as recited in claim 8, further comprising selecting, by the encoder, the number of pixel component values based on counts of the pixel component values in the plurality of pixels.

13. The method as recited in claim 12, further comprising calculating, by the encoder, a first histogram based on the first number of bits of the pixel component values that is less than a total number of bits of the pixel component values.

14. The method as recited in claim 13, further comprising calculating, by the encoder, a second histogram based on a second number of bits of the pixel component values.

15. A system comprising:
a memory configured to store pixel data; and
an encoder configured to:
receive a plurality of pixels represented by a plurality of pixel component values, each of the pixel component values comprising a number of bits to indicate one of a plurality of color values;
generate a first distribution of the pixel component values based on a first number of bits of each of the pixel component values;
generate a second distribution, different from the first distribution, of the pixel component values based on a second number of bits of each of the pixel component values, the second number of bits being different from the first number of bits, in response to determining all bits of the pixel component values have not been considered; and
generate a palette table, in response to determining all bits of the pixel component values have been considered.

16. The system as recited in claim 15, wherein the encoder is further configured to encode pixel component values using the palette table.

17. The system as recited in claim 15, wherein the second number of bits is greater than the first number of bits.

18. The system as recited in claim 15, wherein the encoder is configured to repeatedly determine distributions of pixel component values until all bits of the pixel component values have been considered.

19. The system as recited in claim 15, wherein the encoder is further configured to select a number of candidate bins, each comprising one or more pixel component values, based on counts of the pixel component values in the plurality of pixels.

20. The system as recited in claim 19, wherein the encoder is further configured to calculate a first histogram based on the first number of bits of the pixel component values that is less than a total number of bits of the pixel component values.

* * * * *

UNITED STATES PATENT AND TRADEMARK OFFICE
CERTIFICATE OF CORRECTION

| | | |
|---|---|---|
| PATENT NO. | : 12,047,565 B2 | Page 1 of 1 |
| APPLICATION NO. | : 17/385030 | |
| DATED | : July 23, 2024 | |
| INVENTOR(S) | : Pan et al. | |

It is certified that error appears in the above-identified patent and that said Letters Patent is hereby corrected as shown below:

In the Claims

Column 13, Claim 13, Line 40, please delete "claim 12" and substitute -- claim 8 --.

Signed and Sealed this
Thirty-first Day of December, 2024

Derrick Brent
*Acting Director of the United States Patent and Trademark Office*